Figure 1:
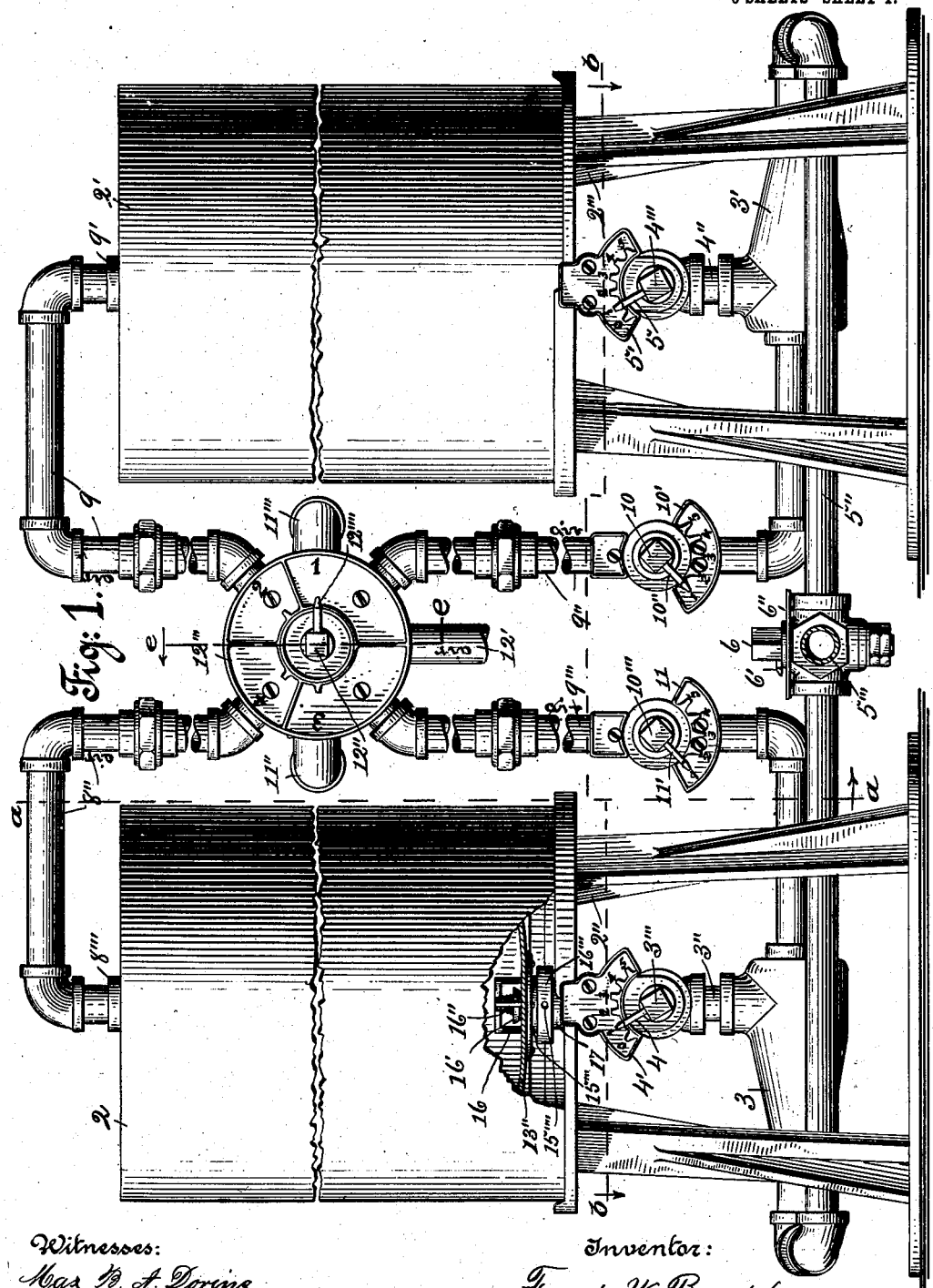

F. W. BEARDSLEY.
GAS TANKS AND DISTRIBUTING CONNECTIONS THEREFOR.
APPLICATION FILED MAR. 13, 1903.

937,406.

Patented Oct. 19, 1909.
6 SHEETS—SHEET 2.

Witnesses:

Inventor:
Frank W. Beardsley
Albert C. Tanner,
his Attorney:

F. W. BEARDSLEY.
GAS TANKS AND DISTRIBUTING CONNECTIONS THEREFOR.
APPLICATION FILED MAR. 13, 1903.

937,406.

Patented Oct. 19, 1909.
6 SHEETS—SHEET 3.

Witnesses:
Max B. A. Doring.
A. W. Kurz

Inventor:
Frank W. Beardsley
By his Attorney: Albert C. Tanner.

F. W. BEARDSLEY.
GAS TANKS AND DISTRIBUTING CONNECTIONS THEREFOR.
APPLICATION FILED MAR. 13, 1903.
937,406.
Patented Oct. 19, 1909.
6 SHEETS—SHEET 4.
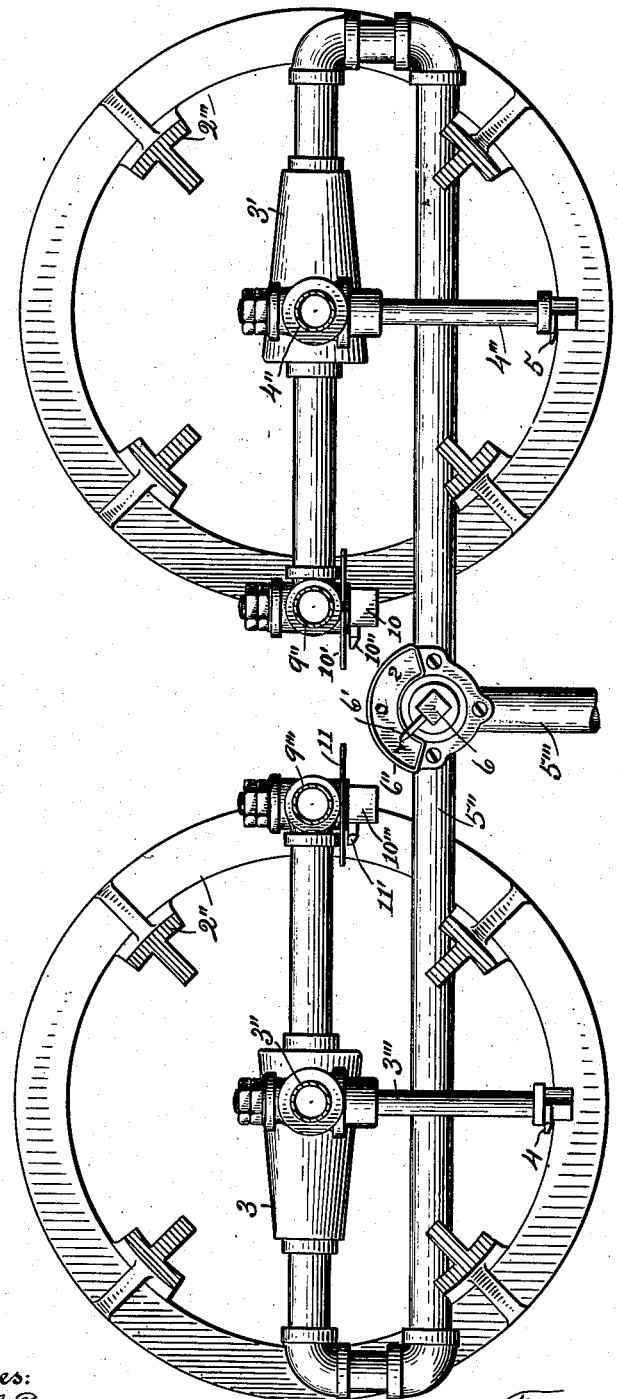
Fig: 4.
Witnesses:
Max B. A. Doring.
Inventor:
Frank W. Beardsley
By his Attorney Albert C. Tanner.

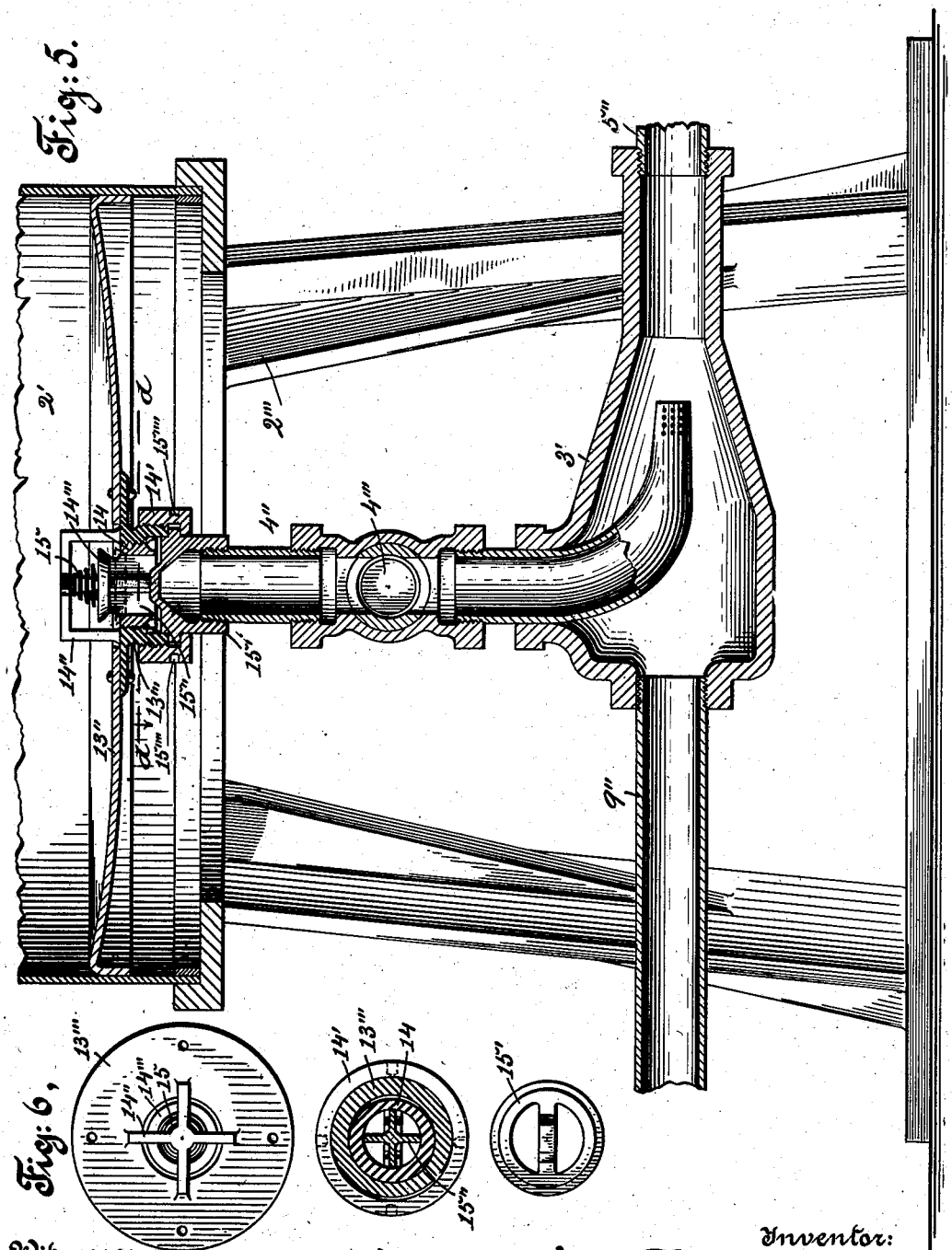

F. W. BEARDSLEY.
GAS TANKS AND DISTRIBUTING CONNECTIONS THEREFOR.
APPLICATION FILED MAR. 13, 1903.
937,406.
Patented Oct. 19, 1909.
6 SHEETS—SHEET 6.
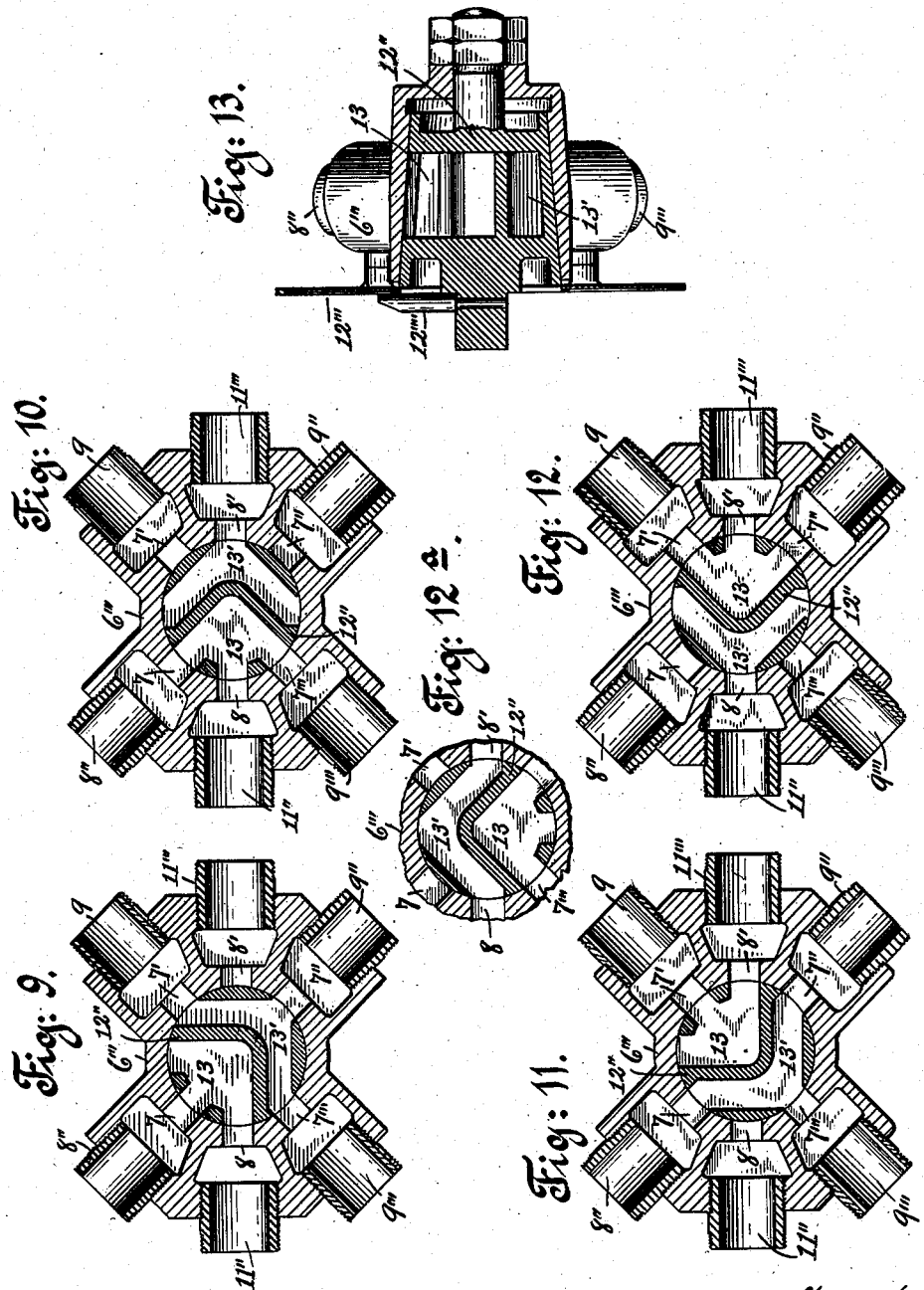
Witnesses:
Max B. H. Doring.
Inventor:
Frank W. Beardsley
By his Attorney:
Albert C. Tanner.

UNITED STATES PATENT OFFICE.

FRANK W. BEARDSLEY, OF NEW YORK, N. Y.

GAS-TANKS AND DISTRIBUTING CONNECTIONS THEREFOR.

937,406. Specification of Letters Patent. Patented Oct. 19, 1909.

Application filed March 13, 1903. Serial No. 147,553.

To all whom it may concern:

Be it known that I, FRANK W. BEARDSLEY, a citizen of the United States, and a resident of New York, Richmond borough, in the county of Richmond and State of New York, have invented certain new and useful Improvements in Gas-Tanks and Distributing Connections Therefor, which improvements are fully set forth in the following specification.

This invention relates to improvements in structures of that class employed for the purpose of storing in distinct intercommunicating tanks a dense gaseous element, such as hydro-carbon gas, and holding the same in readiness for modification as to its density, upon delivery thereof from said tanks, respectively, and for ultimate delivery for consumption when so modified, such structures being appropriately designated gas tanks and distributing connections therefor.

The object of this invention is to provide a gas distributing apparatus of the character indicated which shall be simple and inexpensive as regards construction; durable, efficient and reliable in operation; which shall embody distinct, intercommunicating storage tanks for the gas employed, said tanks being each replaceable by another of its kind, together with novel features of construction adapted to insure permanency in the maintenance of a supply of gas for the purposes of the user, and to facilitate the operation of installing the apparatus as a whole, the periodical adjustment thereof for practical service and the easy replacement of an exhausted tank by a fresh one; which shall be compact, portable and attractive in appearance; and which shall possess certain well-defined advantages over prior analogous structures.

The invention consists in the employment of certain parts novel as to form; in the novel disposition and relative arrangement of the various parts thereof; in certain combinations of the latter, and in certain details of construction, all of which will be specifically referred to hereinafter and set forth in the appended claims.

Figure 2:
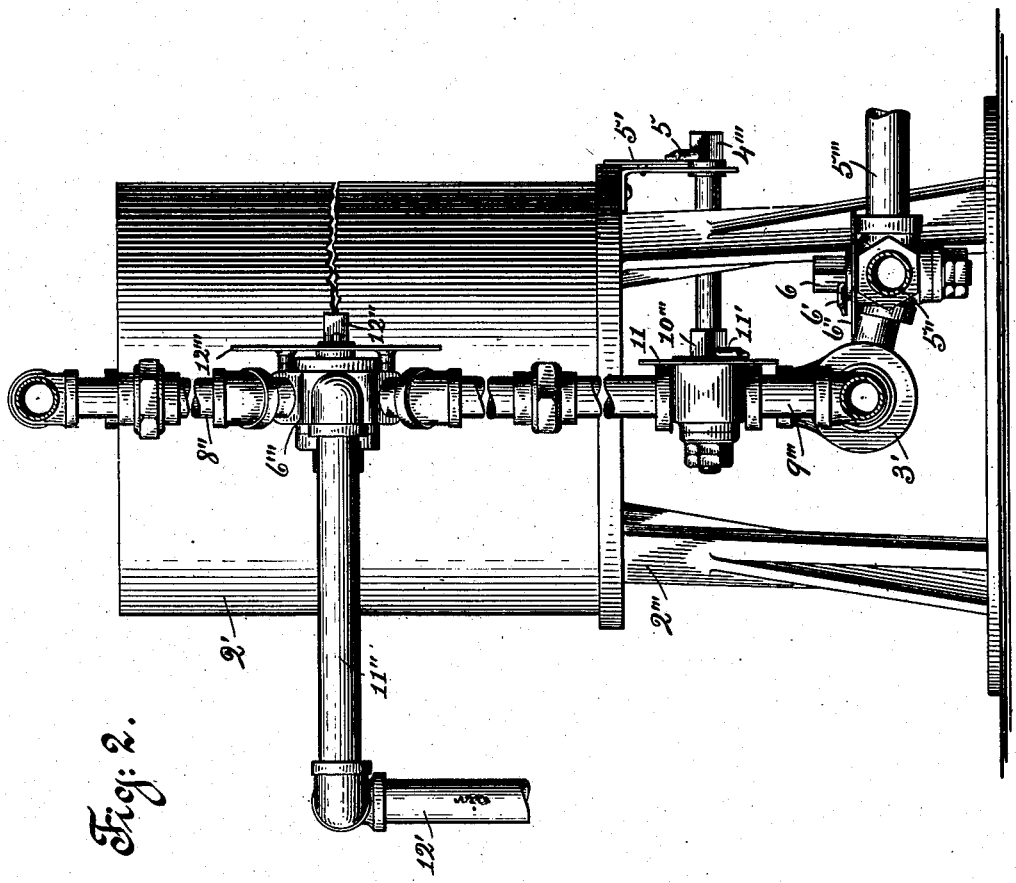
Figure 3:
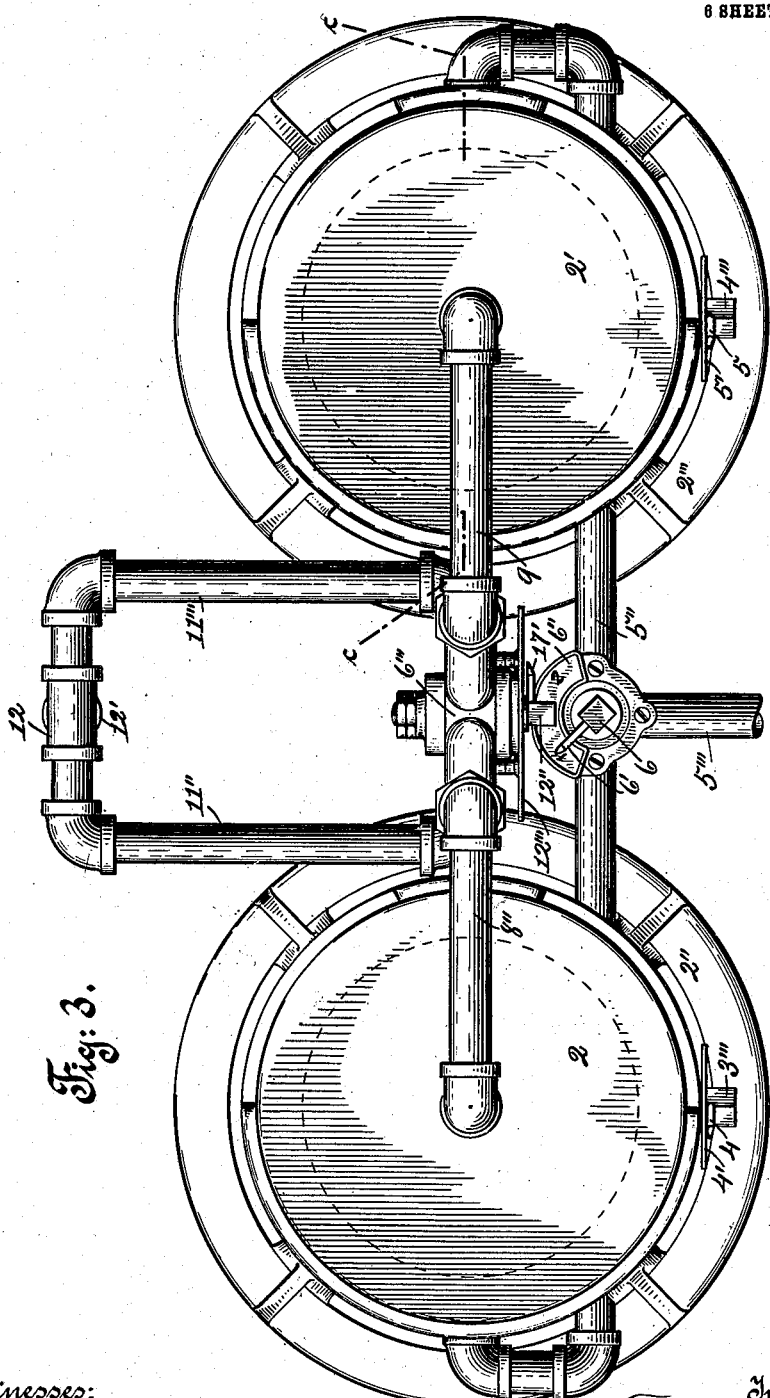

The invention is clearly illustrated in the accompanying drawings, wherein similar reference-characters denote corresponding parts throughout the several views, and as to said drawings:

Figure 1 is a front elevation of a multiple gas apparatus constructed in accordance with my invention. Fig. 2 is a vertical section along the line $a$—$a$ of Fig. 1. Fig. 3 is a plan view of said apparatus. Fig. 4 is a horizontal section along the line $b$—$b$ of Fig. 1. Fig. 5 is a detail sectional view on an enlarged scale, the section being taken as along the line $c$—$c$ of Fig. 3, and the major portion of the storage tank there illustrated being broken away. Fig. 6 is a detail plan view of the valve-controlled discharge nozzle of one of the storage tanks, same being shown detached from the tank. Fig. 7 is a detail sectional view, the section being taken along the line $d$—$d$ of Fig. 5. Fig. 8 is a detail plan view of the bridged union-member employed at the intake end of the tank delivery-pipe. Figs. 9, 10, 11, 12 and $12^a$ are respectively detail sectional views illustrating certain of the several positions assumed, in practical service, by the universal valve which constitutes an element of my improved apparatus, the scale being enlarged as regards each of said views. Fig. 13 is a detail sectional view illustrating more clearly the construction of the universal valve aforenamed, the section being taken as along the line $e$—$e$ of Fig. 1, and the valve occupying the position indicated in Fig. 9 of the drawings.

Having reference to the accompanying drawings, 2 2' denote storage tanks, arranged so that a suitable space intervenes between them, each of any appropriate cross-sectional contour, each formed from thin material, preferably sheet-metal, and removably supported, the one by a skeleton base 2'' and the other by a like base 2'''.

3 3' denote mixers, the former arranged beneath tank 2 and the latter beneath tank 2'. These mixers are each of any appropriate construction, though taking the form illustrated in the drawings and described in United States Patent granted to me Jan. 19, 1904, No. 750,016.

Communication is established between tank 2 and mixer 3 by way of intermediate pipe 3'', controlled by valve 3''', in conjunction with which are arranged a pointer 4 and dial 4'; and between tank 2' and mixer 3' by way of intermediate pipe 4'', controlled by valve 4''', in conjunction with which are arranged a pointer 5 and dial 5'.

The mixers 3 3' discharge into a final delivery pipe 5'', common thereto, which in turn discharges into the service pipe 5''', said pipe 5''' being controlled by a three-way valve 6, in conjunction with which are arranged a pointer 6' and dial 6''.

Tanks 2 2' are employed for the purpose of storing a dense gaseous element, such as hydro-carbon gas; and it is desirable that air be availed of as a factor in the operation of forcing out the dense contents of said tanks, or either of them, and as a diluent for said dense contents upon the latter being delivered from either of said tanks to and into its coöperating mixer, such air being utilized in both instances, that is, for gas-exhausting purposes within the tanks and gas-diluting purposes within the mixers, under a pressure uniform to both. Accordingly I make use of a system of air-conductors or pipes whereby air may be taken from an appropriate general source, as an air-current generator of any approved type, preferably such as specified in the patent to me hereinbefore referred to, and conducted to and into said tanks, or either of them, at the top thereof; simultaneously to and into either of said tanks and its coöperating mixer, and independently of the opposite tank and its coöperating mixer; indirectly to and into either of said tanks and its coöperating mixer by way of the opposite tank and the latter's coöperating mixer, or otherwise in a manner to render the same available in connection with said tanks and mixers, separately, collectively, or partially as a whole, for the purposes stated, there being conjoined with said system of air-conductors an air-distributing connection, controlled by a device adapted to direct, under due manipulation, the course or courses of movement of such air outwardly from said air-distributing connection.

Specifically the air-distributing connection aforenamed comprises a body 6''' having a plurality of radial outlet ports 7, 7', 7'', 7''', arranged 90° apart, and opposite, radial inlet ports 8 8', the former arranged midway between the ports 7 7''' and the latter midway between the ports 7' 7''.

Air-conductor 8'' leads from the port 7 to and connects with the nozzle 8''' of tank 2; air-conductor 9 leads from the port 7' to and connects with the nozzle 9' of tank 2'; air-conductor 9'' leads from the port 7'' to and connects with the mixer 3', at the rear thereof, and air-conductor 9''' leads from the port 7''' to and connects with the mixer 3, at the rear thereof.

Air-conductors 9'' 9''' are locally controlled, the one by a single-way, auxiliary valve 10, in conjunction with which are arranged a dial 10' and pointer 10'', and the other by a like valve 10''', in conjunction with which are arranged a dial 11 and pointer 11'.

Air-conductors 11'' 11''' lead respectively from the ports 8 8', outwardly from the connection 6''', thence rearwardly thereof, and are connected by the cross-conductor 12, conjoined with which is the initial intake pipe 12', leading from the source of air employed.

Connection 6''' approximates the form of a valve-casing, and serves not only as a fixed medium for distributing the air employed, but also as a central union for the system of air-conductors just described. It is provided with a central opening to receive a universal valve 12'', adapted, when duly adjusted, to control the several inlet and outlet ports of the connection 6'''. The valve 12'' is here shown as having two independent, angular air-spaces 13, 13', provided each with three openings leading outwardly therefrom; and the relative arrangement of the several openings of the said air-spaces is such that when valve 12'' occupies the position indicated in Fig. 12ª of the drawings, all of the outlet ports of the connection 6''' are closed; when said valve occupies either of the positions indicated in Figs. 9 and 11 of the drawings, all of the outlet ports of the connection 6''' are open, and one of the inlet ports is closed; and when said valve occupies either of the positions indicated in Figs. 10 and 12 of the drawings, communications between the one inlet port and the two neighboring outlet ports at one side of the connection 6''' is closed, while the one inlet port and two neighboring outlet ports at the opposite side of the connection 6''' are open. It will be understood that the valve 12'' may be otherwise arranged as regards its air-spaces, the openings leading therefrom, and the relation of the latter to the outlet and inlet ports of the connection 6'''.

In conjunction with the valve 12'' there are arranged a dial 12'''' and pointer 12''''', the said dial, in this instance, being figured to indicate the four positions which the valve 12'' is shown as occupying, respectively, in Figs. 9, 10, 11 and 12 of the drawings.

It will be seen that the valve 12'' may be caused to occupy operative positions with respect to the connection 6''' in addition to those indicated in the drawings; but the latter are held as most essential to the practical operation of the apparatus as a whole.

Tank 2' is provided at its bottom-portion 13'' with a discharge nozzle 13''', interiorly threaded to receive an annular valve-seat 14, exteriorly threaded to receive a male coupling-member 14', and provided with a skeleton valve-keeper 14'', the latter formed integral therewith, by preference, rising upwardly therefrom, and normally projecting into the tank 2' by way of a suitable opening formed in the bottom-portion 13''.

14''' denotes a disk-valve tending at all times, through the medium of the elastic element 15, here shown in the form of a coiled spring and as interposed between said valve and the keeper 14'', to assume the position indicated in dotted lines in Fig. 5, and accordingly engage the seat 14 for closing the discharge nozzle 13'''.

15' denotes a female coupling-member, which immediately engages the intermediate pipe 4'' at the intake end thereof, and is bridged substantially as indicated in Fig. 8 of the drawings.

Between the bridged member 15' and the valve 14''' I loosely interpose a valve-controller 15'', irregular in cross-sectional contour, and greater in length than the distance, under the assembled condition shown in Fig. 5, between the bridged member 15' and the plane with which the bottom of the valve 14''' registers when occupying its closed position, or operatively engaging the seat 14, so that, during the operation of assembling the parts now under consideration for service, valve 14''', through the medium of said controller, will be displaced from its seat, and moved as to the position indicated in full lines in Fig. 5 of the drawings, thus insuring due escape of the contents of tank 2' by way of the nozzle 13'''. This construction permits the placement of a newly changed tank in position on the supporting base, with its valve closed, and then as the coupling 14' is screwed up, said valve opens automatically and the fresh tank is brought into communication with the mixers.

The skeleton character of the base 2''' permits free access to the parts now under consideration, for adjusting and other purposes, even when tank 2' is in position for service; and the coupling-member 14' may be formed many sided or provided with one or more recesses 15'''', to permit the use in connection therewith, for adjusting purposes, of a spanner or other wrench.

The foregoing parts described as pertaining to tank 2' and the latter's connection with the intermediate pipe 4'', are duplicated as regards tank 2 and intermediate pipe 3''; and in this connection, 15''' denotes the discharge nozzle, conjoined with which is a skeleton valve-keeper 16; 16' denotes a disk-valve for controlling nozzle 15'''; 16'' denotes an elastic element interposed between the valve 16' and the keeper 16; and 16''' 17 denote respectively the coupling-members, the valve 16' being provided with a seat corresponding to that denoted by the numeral 14, (Fig. 5), and a controller corresponding to that denoted by the numeral 15'', (Fig. 5) being interposed between the valve 16' and the coupling-member 17.

Under proper adjustments of the single-way valves 3''', 4''', 10, 10''', respectively, the inflow of gas and the inflow of air to either of the mixers 3 3', may be controlled as to volume, either independently or relatively as desired.

Any suitable coupling device may be employed at the juncture of the air-conductors 8'' 9 with the tanks 2 2', respectively; substantially that set forth in the patent to me hereinbefore referred to, being preferred, however.

In operation, and assuming that only tank 2' and the parts immediately coöperating therewith are required for service, the user adjusts valve 12'' so that pointer 12'''' registers with the numeral 1 on dial 12''', said valve being accordingly brought to the position indicated in Fig. 12 of the drawings; then adjusts three-way valve 6 so that pointer 6' registers, say, with numeral 1 on dial 6'', thus establishing communication between service pipe 5''' and that section of pipe 5'' which leads from mixer 3', and cutting off communication between service pipe 5''' and the opposite section of pipe 5''; then adjusts valve 10 so as to permit the required volume of air to find its way into mixer 3', utilizing pointer 10'' and figured dial 10' in this connection; and then adjusts valve 4''' so as to permit the required volume of gas to find its way from tank 2' into mixer 3', utilizing pointer 5 and figured dial 5' in this connection; whereupon that section of the apparatus as a whole now under consideration is in readiness for practical service, the tank 2' having been previously charged with a hydro-carbon or other dense gas, and a supply of air under due pressure having been admitted into the intake pipe 12', of the system of air-conductors employed. When the gas shall have thus been exhausted from tank 2', and tank 2 and coöperating parts are accordingly and only required for service, it is only necessary to readjust valve 12'' so that its pointer will register with numeral 3 on dial 12''', thus bringing said valve to the position indicated in Fig. 10 of the drawings; readjust valve 6 so that its pointer will register, say, with the numeral 2 on dial 6'', accordingly establishing communication between service pipe 5''' and that section of pipe 5'' which leads from mixer 3, and cutting off communication between said service pipe and the opposite section of pipe 5''; and readjust valves 3''' 10''', utilizing in this connection pointers and dials arranged in conjunction with the valves last named, respectively. In the meantime the user notifies the party or parties supplying the charged tanks, to replace the exhausted tank with a freshly charged one, and so on as the tanks are successively exhausted in the practical working of the apparatus.

At times it may be desirable to apply the air volume to the full tank indirectly by way of the empty tank, for the purpose of securing complete exhaustion of the gas from the latter; and in such instances the air volume may be applied to full tank 2 indirectly by way of empty tank 2', by adjusting valve 12" to the position indicated in Fig. 11 of the drawings, its pointer then registering with the numeral 2 on dial 12"'; and a reversal of this application of the air volume, as regards tanks 2 2', may be effected by adjusting valve 12" to the position indicated in Fig. 9 of the drawings.

Under the first application of the air volume mentioned in the preceding paragraph, valves 4'" and 10 are ordinarily left fully open, valves 3'" and 10'" being availed of for regulating the inflow of gas and the inflow of air to the mixer 3; and under the second application of the air volume mentioned in the preceding paragraph, valves 3'" and 10'" are ordinarily left fully open, valves 4'" and 10 being availed of for regulating the inflow of gas and the inflow of air to the mixer 3'.

Particular attention is here called to the fact that, in the practical operation of my improved apparatus, the proportioning of the air and gas admitted to either of the mixers aforenamed, may be effected with such nicety as to insure a resultant mixture of air and gas which, when ignited, will leave no residual deposit and will yield no odor, thus evidencing completeness in the process of combustion where such resultant mixture is employed; and to accomplish such proportioning of the gas and air, valves 3'", 4'", 10, 10'" are relatively availed of.

When desired universal valve 12" may be adjusted to the position indicated in Fig. 12ᵃ of the drawings, thus shutting off the air volume from both of the tanks 2 2' and both of the mixers 3 3'.

The several valves of my improved apparatus may be operated each by means of the pointer conjoined therewith, or by means of any suitable implement, as an ordinary wrench.

It will be seen that my improved apparatus is particularly well adapted for the purposes for which it is intended, and further that the same may be modified to some extent without materially departing from the spirit and principle of my invention.

Having fully described my invention what I claim and desire to secure by Letters-Patent, is:

1. An apparatus of the class herein described comprising neighboring tanks; neighboring mixers, one beneath each of said tanks; connections whereby communication between each of said tanks and its coöperating mixer may be effected; an air distributer; a system of pipes connecting the air distributer with each of said tanks at the top thereof, and with each of said mixers; and means for controlling said distributer in such manner that air received thereby may be conducted into either of said tanks and its coöperating mixer, independently of the other tank and the latter's coöperating mixer, said distributer being also provided with means whereby the air may be directed entirely through one tank and then to the top of the neighboring tank, substantially as herein specified.

2. An apparatus of the class herein described comprising neighboring tanks; neighboring mixers, one beneath each of said tanks; connections whereby communication between each of said tanks and its coöperating mixer may be effected; an air distributer; a system of pipes connecting said distributer with each of said tanks at the top thereof, and with each of said mixers; and means for controlling said distributer in such manner that air received thereby may be conducted into either of said tanks and its coöperating mixer, indirectly by way of the neighboring tank and the latter's coöperating mixer, substantially as herein specified.

3. An apparatus of the class herein described comprising neighboring mixers; a delivery pipe common to said mixers; and means for conducting a volume of gas and a volume of air into either of said mixers, the gas being conducted directly into such mixer, and the air being conducted indirectly into the same by way of the opposite mixer, substantially as herein specified.

4. An apparatus of the class herein described comprising neighboring tanks; neighboring mixers, one beneath each of said tanks; valve-controlled intermediate pipes, one connecting each of the tanks aforenamed with its coöperating mixer, and establishing communication between the same; an air distributer; pipes connecting said distributer with each of said tanks at the top thereof; valve-controlled pipes connecting said distributer with each of said mixers; and a universal valve at said distributer for regulating the passage of air of the pipes leading from said distributer, substantially as herein specified.

5. An apparatus of the class described comprising neighboring tanks, mixers beneath each of said tanks, an air distributer common to said tanks, outlet ports in said distributer connected to the top of the tanks, outlet ports connected to the mixers beneath the tanks, air inlet ports connected to a source of air pressure, and a universal valve in said distributer adapted to connect one of said inlet ports with the outlet ports leading to one of the tanks and its mixer, and at the same time shut off communication between the air inlet and the ports leading to the neighboring tank and mixer, substantially as described.

6. An apparatus of the class described comprising neighboring tanks, mixers opposite said tanks, an air distributer common to said tanks, two upper outlet ports connected to the upper ends of the tanks, two lower outlet ports connected to the mixers beneath said tanks, air-pressure inlet ports located between each pair of upper and lower outlets, and a universal valve in said distributer, said valve having two parallel non-communicating, angular passages therethrough, and a diametric passage leading into each of said angular passages, whereby the valve is adapted to variably coöperate with said ports, substantially as described.

7. An apparatus of the class described comprising neighboring removable tanks, discharge openings in the bottom of said tanks, valves in said openings elastically held to their seats, permanent outlet pipes the upper ends of which are adapted to engage with the discharge openings and to thereby raise the valves from their seats, mixers connected to said outlet pipes, an air distributer common to all of the tanks, an air pressure pipe connected to the distributer, air outlet pipes from the distributer removably connected to the upper end of the tanks, air outlet pipes from the distributer to each of said mixers, and a valve in said distributer having passages adapted to connect the tank and the mixer pipes of one tank with the source of air supply, and to disconnect the tank and mixer pipes of another tank from said supply, substantially as described.

8. An apparatus of the class described comprising neighboring removable tanks, discharge openings in the bottom of said tanks, an elastically controlled valve for normally closing said openings, permanent outlet pipes from the tanks, couplings on the same adapted to be connected to said discharge openings, an upwardly projecting bridge across the said couplings adapted to push open the valve as the coupling is connected to the discharge opening, mixers connected to said outlet pipes, an air distributer common to all the tanks, an air pressure pipe connected to the distributer, air outlet pipes from the distributer removably connected to the upper ends of the tanks, air outlet pipes from the distributer to each of said mixers, and a valve in said distributer having passages adapted to connect the tank and mixer pipes of one tank with the source of air supply, and to disconnect the tank and mixer pipes of another tank from said supply, substantially as described.

9. A gas apparatus comprising a plurality of tanks, an air supply pipe, a distributing valve receiving air from said pipe, means connecting said distributing valve to the upper ends of the tanks, air mixers below the tanks, means connecting said mixers to the tanks, and means connecting said mixers to the air distributing valve, a common outlet from said mixers, means for connecting said outlet to one mixer and cutting off said outlet from the other mixer, means within the air mixing valve whereby the air supply may be connected to the top of either tank, said valve also containing means whereby the air supply may be directed entirely through one tank and then to the top of the other tank, and means in the air pipes and in the gas pipes to regulate the quantity of fluid passing therethrough.

10. A gas apparatus comprising two removable tanks provided with discharge openings in the bottoms thereof, automatically closing valves for said openings, means to open said valves when said tanks are connected to the gas outlet pipes, air and gas mixers connected to said gas outlet pipes, an air supply pipe, an air distributing valve connected to said supply pipe, pipes connecting said valve to the mixers, pipes connecting said valve to the upper ends of the tanks, said valve being provided with suitable ports whereby air may be supplied to the top of one tank only, and with other ports whereby air may be caused to flow entirely through one tank and then to the top of the neighboring tank, and valves in the air pipes leading to the mixers, and valves in the gas pipes whereby the proportions of air and gas flowing to the mixers may be regulated.

FRANK W. BEARDSLEY.

Witnesses:
A. W. KURZ,
W. H. RUBY.